United States Patent [19]

Müller

[11] Patent Number: 4,480,423

[45] Date of Patent: Nov. 6, 1984

[54] ARRANGEMENT FOR UNLOADING AND LOADING X-RAY FILM CASSETTES

[75] Inventor: Jürgen Müller, Munich, Fed. Rep. of Germany

[73] Assignee: Agfa-Gevaert Aktiengesellschaft, Leverkusen, Fed. Rep. of Germany

[21] Appl. No.: 384,163

[22] Filed: Jun. 1, 1982

[30] Foreign Application Priority Data

Jun. 6, 1981 [DE] Fed. Rep. of Germany ....... 3122583

[51] Int. Cl.³ ....................... B65G 65/04; B65B 43/38
[52] U.S. Cl. .................................... 53/266 R; 53/382; 206/455; 206/814; 271/171; 414/411
[58] Field of Search ...................... 53/266 C, 244, 237, 53/238, 381 R, 382, 504, 67, 540; 414/411, 404; 206/248, 814, 527, 455; 271/171, 164, 303, 9, 238, 240

[56] References Cited

U.S. PATENT DOCUMENTS

| | | | |
|---|---|---|---|
| 3,069,002 | 12/1962 | Hart | 206/455 X |
| 3,150,263 | 9/1964 | Catlin | 53/266 C |
| 3,921,972 | 11/1975 | Miller | 271/171 |
| 4,049,142 | 9/1977 | Azzaroni | 414/411 X |
| 4,159,769 | 7/1979 | Hatten et al. | 206/527 |
| 4,227,089 | 10/1980 | Plessers et al. | 53/266 C |
| 4,245,831 | 1/1981 | Michatek | 271/171 |
| 4,249,818 | 2/1981 | Buldini | 414/411 X |
| 4,249,819 | 2/1981 | Boser et al. | 414/411 X |

Primary Examiner—Horace M. Culver

Attorney, Agent, or Firm—Michael J. Striker

[57] ABSTRACT

An arrangement for unloading and loading X-ray film cassettes includes a frame-shaped support bounding a guiding channel in which there are received, one above the other, a plurality of mounting portions and, at the top, a cassette-handling unit. The mounting portions have identical configurations and bound respective channels of identical dimensions in each of the mounting portions. Storage receptacles of external dimensions compatible with those of the channels are respectively introduced into the latter. Each of the storage receptacles includes an insert selected from a plurality of inserts. Each of the inserts bounds a recess which is so dimensioned as to fittingly receive a stack of films of a given size. The recesses are so arranged that one corner of the recess is arranged at the same corner region of the insert in all of the inserts. The cassette-handling arrangement includes devices which open the cassette, withdraw the film therefrom, introduce a fresh film thereinto, and close the cassette. The films withdrawn from the cassette can be directly fed into a processing machine, or they may be forwarded into a storage container mounted on the cassette-handling unit. The mounting portions have aligned through passages at their associated ends, through which the films withdrawn from the storage receptacles are transported by transporting rollers toward the respective cassettes. A path-selecting element may be provided for bypassing the storage container.

10 Claims, 2 Drawing Figures

ARRANGEMENT FOR UNLOADING AND LOADING X-RAY FILM CASSETTES

BACKGROUND OF THE INVENTION

The present invention relates to arrangements for handling cassettes in general, and more particularly to an arrangement for loading and unloading X-ray film cassettes.

There are already known various constructions of arrangements for unloading and loading X-ray film cassettes. Such arrangements usually include a cassette-handling station at which the respective cassette is handled in a light-tight manner, this station including means for opening and closing the cassette. These arrangements conventionally further include means for withdrawing the films from the cassettes present at the cassette-handling station and for introducing new films into the cassettes, also at the cassette-handling station, while the respective cassette is open, a plurality of input channels serving to accommodate respective storage receptacles which respectively contain stacks of films of different sizes, the same number of devices for singularizing and individually removing the films from the respective stacks in the respective storage receptacles, a first transporting device for transporting the individual films removed from the respective stacks in the respective storage receptacles to the cassette-handling station, and a second transporting device for conveying the films removed from the respective cassettes out of the cassette-handling station.

The loading and unloading arrangements of the above-described type are suited to perform cassette-unloading and cassette-loading operations in daylight or artificial light, that is, outside of a darkroom. An arrangement of this type is known, for instance, from the published German patent application DE-OS No. 26 07 876. An important disadvantage of this conventional construction is to be seen in the fact that it is designed for handling films of only a few pre-selected sizes, and that the number of different film sizes which can be handled by the arrangement is predetermined. Considering the huge number of different sizes of films currently used in X-ray diagnostics, the five different film sizes which this conventional arrangement is capable of handling is insufficient. Yet, an expansion of the arrangement to make it capable of handling more than five different film sizes is impossible in this conventionally constructed arrangement, particularly for structural reasons and space considerations. Finally, the capital investment which, with such a complicated machine, necessarily must be relatively high, is too high when the limited possibilities of use (low number of film sizes which can be handled thereby) are taken into consideration.

SUMMARY OF THE INVENTION

Accordingly, it is a general object of the present invention to avoid the disadvantages of the prior art.

More particularly, it is an object of the present invention to provide an arrangement for unloading and loading X-ray film cassettes, which does not possess the disadvantages of the conventional arrangements of this type.

Yet another object of the present invention is to so construct the arrangement of the type here under consideration as to significantly expand the possibilities of use thereof and especially the number of different sizes of the films which can be handled by this arrangement.

It is still another object of the invention to so design the arrangement of the above type as not to significantly increase its cost, if at all, despite its increased versatility.

A concomitant object of the present invention is to devise an arrangement of the above-mentioned type which is relatively simple in construction, inexpensive to manufacture, easy to use, and reliable in operation nevertheless.

In pursuance of these objects and others which will become apparent hereafter, one feature of the present invention resides in an arrangement for unloading and loading cassettes, especially X-ray film cassettes, this arrangement including a frame-shaped support; a cassette-handling station mounted on the support and including a housing defining an internal chamber for receiving the respective cassette, and means for light-tightly handling the respective cassette within the internal chamber, including means for unloading and loading the respective cassette; a plurality of storage receptacle mounting portions of identical configurations supported in the frame-shaped support and having respective channels of identical dimensions; a plurality of storage receptacles having identical external dimensions compatible with those of the channels for accommodation therein and each including means for bounding a recess dimensioned to fittingly receive a stack of films of a size selected from a plurality of different sizes; means for transporting the individual films from the respective storage receptacles to the handling station for loading into the respective cassettes; and means for conveying the films unloaded or withdrawn from the respective cassettes out of the handling station. It is particularly advantageous when the bounding means includes a number of inserts at least corresponding to the number of the storage receptacles and each having one of the recesses and being received in one of the storage receptacles.

A particular advantage of the above-discussed construction is that it renders it possible to assemble the arrangement of the present invention in a modular form. In this manner, it is possible to freely select any combination of the film sizes to be handled by the arrangement, as well as to choose the number of the films sizes to be handled, while substantially maintaining the dimensions and throughput of the conventional arrangements of this type. In this arrangement, it is possible to accommodate a stack of films of a given size in more than one of the storage receptacle, and to substitute one film size for another by merely replacing the storage receptacle by another one.

Advantageously, each of the inserts has a substantially plate-shaped configuration having a height substantially corresponding to the height of the stack of films to be received in the recess thereof, the recesses of the inserts having substantially rectangular configurations and being so situated that one corner thereof is arranged at the same corner region of each of the inserts. Generally speaking, the bounding means of each of the storage receptacles is so configured and situated that the respective recess is substantially rectangular and has a depth substantially corresponding to the height of the stack to be received therein, and that one corner of the respective recess is arranged at the same corner region of each of the storage receptacles. This construction has the advantage that the films of the respective stack will be fittingly and safely received in the respective recess and that the aforementioned corner will be in the position needed for unproblematical operation of the singularizing means, regardless of the size of the respective stack of films.

In accordance with a further advantageous facet of the present invention, each of the storage receptacle mounting portions extends substantially along a plane and includes a slot-shaped through passage extending normal to this plane and transversely to the direction of introduction of the respective storage receptacle into the channel of the respective mounting portion. In this context, it is particularly advantageous when the cassette-handling station is constructed as a cassette-handling unit introducible into the frame-shaped support and includes a receiving recess; and when there is further provided a separate film-handling unit at least partially received in the receiving recess. Then, the receiving recess is advantageously in substantial alignment with the through passages of the mounting portions. The film-handling unit advantageously includes a frame-shaped mounting element received in the receiving recess, and a storage container separate from and mounted on the mounting element. When the arrangement is thus equipped with the storage container for the films, it can be used exclusively as a film-unloading arrangement. However, in a similar manner, the arrangement of the present invention can be used or modified to be used solely for introducing the films into the cassettes.

A particularly advantageous contruction of the arrangement of the present invention is obtained when the film-handling unit includes an intermediate component connectable with a film-processing machine, a deflecting unit interposed between the intermediate component and the cassette-handling unit, a frame-shaped mounting element connectible to the intermediate component, and a storage container separate from and mounted on the mounting component. The deflecting unit is advantageously equipped with a path-selecting element situated therein and operative for guiding the respective film into a selected one of at least two paths. This expedient renders it possible, for instance, to let some of the unloaded films bypass the storage container and thus obtain preferential treatment over the films then received in the storage container.

The novel features which are considered as characteristic of the invention are set forth in particular in the appended claims. The improved cassette unloading and loading arrangement itself, however, both as to its construction and its mode of operation, together with additional features and advantages thereof, will be best understood upon perusal of the following detailed description of certain specific embodiments with reference to the accompanying drawing.

DETAILED DESCRIPTION OF THE PREFERRED EMBODIMENTS

Figure 1:
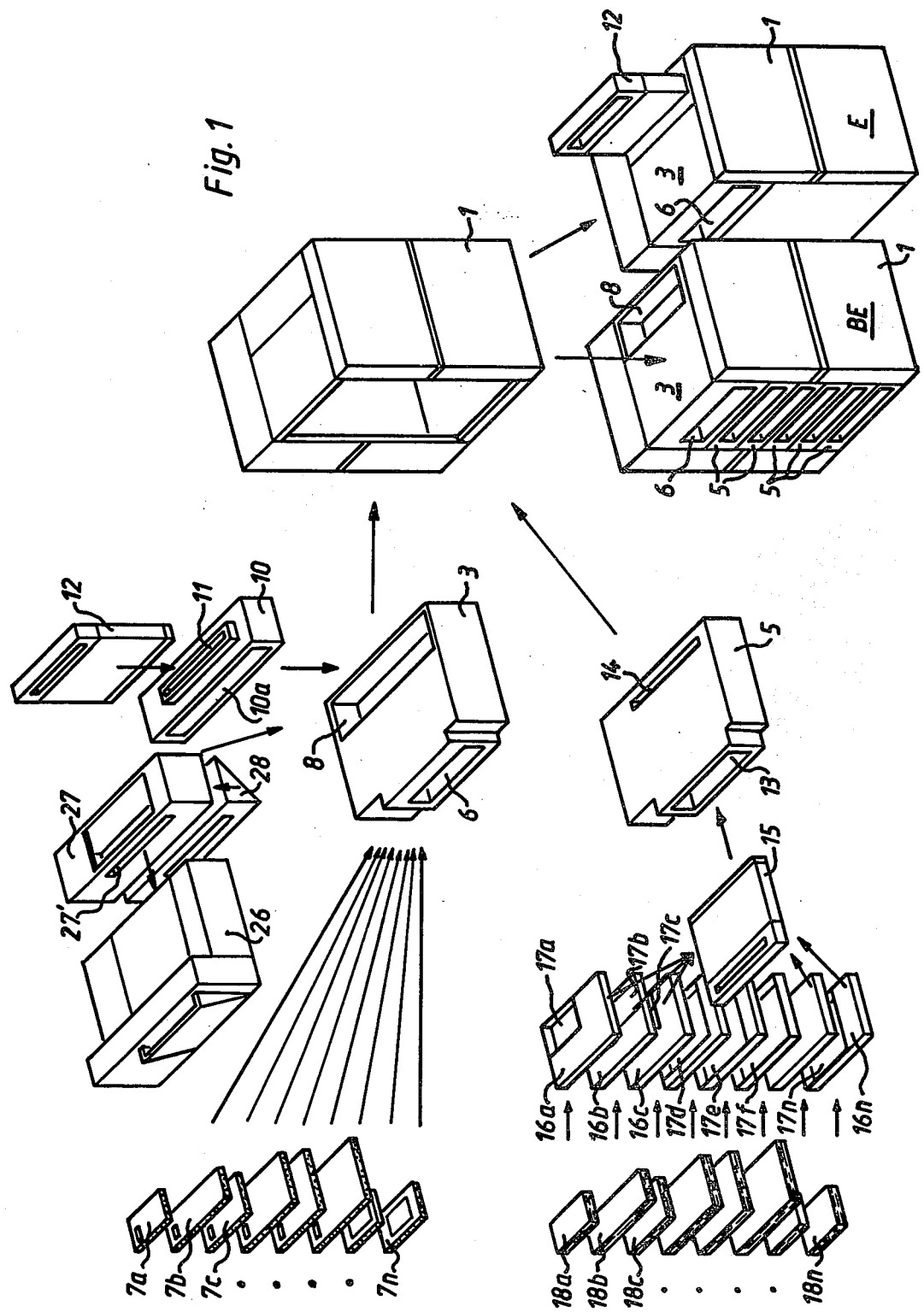
FIG. 1 is an exploded perspective view of the arrangement of the present invention depicting the various modular components thereof.

Referring now to the drawing in detail, and first to FIG. 1 thereof, it may be seen that the reference numeral 1 has been used therein to identify a frame-shaped support. The frame-shaped support 1 defines, at one of its sides, a guiding recess 2 for a cassette-handling station or unit 3 as well as for a plurality of storage receptacles 5. The cassette-handling unit 3 is provided with means for light-imperviously closing the interior of the unit 3, means for opening and closing the respective cassette present in the interior of the unit 3, and means for removing or unloading the films from the respective cassettes during their presence in the interior of the unit 3. Such components or means are of conventional construction which is shown, for instance, in the aforementioned published German patent application DE-OS No. 26 07 876, so that they need not be discussed here in any detail and so that they have been omitted from the drawing in order not to unduly clutter the same. The cassette-handling unit 3 further includes an outwardly extending channel-shaped opening 6, into which there can be introduced cassettes 7a to 7n of various sizes.

At its end remote from the opening 6, the cassette-handling unit 3 is provided with a through passage or receiving recess 8 which extends normal to the plane of the unit 3, that is, from the upper surface to the lower surface of the unit 3 as considered in the drawing. The receiving recess 8 is in alignment with an associated opening 9. A storage container mounting element 10 is received in the receiving recess 8 of the cassette-handling unit 3 and in the opening 9 of the frame-shaped support 1 and has an upwardly open slot 11 into which a storage container 12 can be inserted. The storage container 12 may, for instance, have the construction revealed in the European patent application No. 0 017 269. In any event, the mounting element 10 is equipped with deflecting or guiding elements which are operative for guiding a film which is introduced into the mounting element 10 through an opening or slot 10a in the upward direction and through the opening 11 into the storage container 12.

The storage receptacle units 5 have identical configurations. Each of them includes a horizontally extending inlet opening 13 and, at the opposite end therefrom, a pay-out or passthrough slot 14 at its upper or lower side. The inlet opening 13 has a channel-shaped configuration. Each of the storage receptacle units or mounting portions 5 also accommodates means for singularizing films and withdrawing the same on an individual basis, as well as transporting means for transporting the withdrawn individual films through the slots 14. The inlet opening 13 is so dimensioned that a storage receptacle 15 can be introduced therethrough into the interior of the mounting portion 5. Moreover, means for opening the storage receptacle 15 is provided in the interior of the mounting portion 5. According to the present invention, respective inserts 16a to 16n are accommodated in the storage receptacle. The inserts 16a to 16n are advantageously constructed as substantially plate-shaped elements having identical external dimensions. The inserts 16a to 16n are provided with respective recesses 17a to 17n all of which have a corner at the same corner region of each of the respective inserts 16a to 16n. The dimensions of the recesses 17 to 17n are such that each of them can receive in a fitting manner, that is, without any considerable play, a stack of films of a given size. The stacks of films are indicated by respective reference numerals 18a to 18n. The height of the plate-shaped inserts 16a to 16n at least corresponds to the height of the hightest one of the film stacks 18a to 18n.

As also illustrated in FIG. 1, an intermediate component 27 can be inserted into the recess of the cassette-handling unit 3 instead of the mounting element 10 for the storage container 12. Then, the mounting element 10 for the storage container 12 is introduced into the intermediate component 27 from above, and a deflecting unit 28 is inserted into the intermediate component 27 from below. Then, an input part of a film processing machine 26 is connected to the intermediate component 27 which has a slot-shaped opening 27' for this purpose.

When the above construction is used, there is obtained a compact arrangement, in which the unloading of the respective cassette 7a to 7n takes place either directly into the processing machine 26, or into the storage container 12 and from there, possibly, into the processing machine 26.

During the operation of the above-discussed arrangement, the first activity to be attended to is to equip the storage receptacles 15 with the desired inserts 16a to 16n. Then, the corresponding stacks 18a to 18n are introduced into the respective recesses 17a to 17n in a darkroom and the storage receptacles 15 are closed. Thereafter, the storage receptacles 15 are introduced in any desired succession into the openings or channels 13 of the storage receptacle mounting portions 5. Now, the first of a succession of cassettes 7a to 7n can be introduced through the inlet opening 6 of the cassette-handling unit 3 into the interior of the latter. The size of the respective cassette 7a to 7n will be sensed in a conventional manner, and films will be withdrawn from the storage receptacles 15 in accordance with the sensed values.

Figure 2:
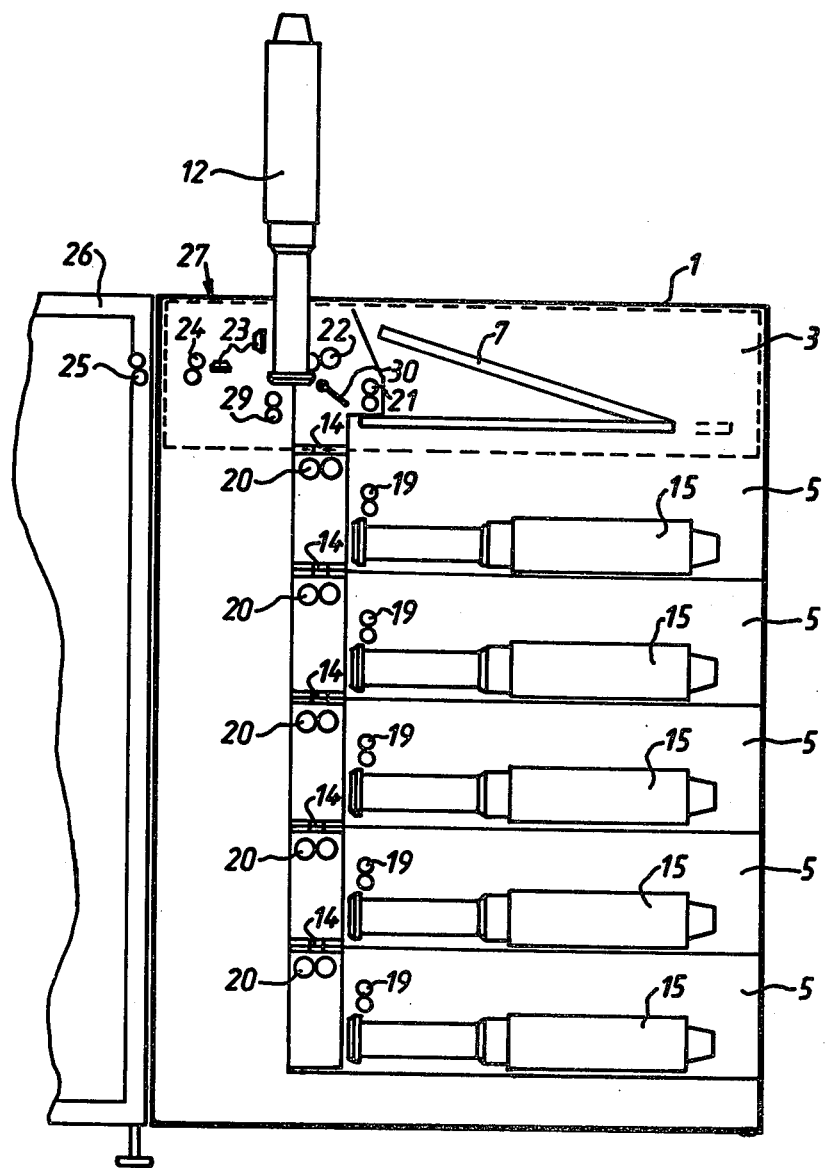
FIG. 2 is a somewhat diagrammatic sectional view through the assembled arrangement of FIG. 1.

FIG. 2 illustrates in a more detailed manner the construction and the mode of operation of the arrangement of the present invention equipped with the intermediate component 27. The frame-shaped support 1 and the modules 3 and 5 supported therein are indicated in FIG. 2 only in a simplified, diagrammatic manner.

The storage receptacles 15 are accommodated in the mounting portions 5 which are arranged above one another. A first transporting roller pair 19 is arranged at the output side of each of the storage receptacles 15. Furthermore, another transporting roller pair 20 is situated below each of the through passages 14. Deflecting elements, which have been omitted from the drawing, are arranged between the respective transporting roller pairs 19 and 20. An open cassette 7 is present in the interior of the cassette-handling unit 3. An introducing roller pair 21, and a withdrawing roller pair 22 are arranged at the opening of the cassette 7. The withdrawing roller pair 22 advances the respective witdrawn film 18 to the inlet region of the storage container 12. Forwarding elements 23 are arranged at the outlet region of the storage container 12, which forward the film withdrawn from the storage container 12 to an output roller pair 24, from where it proceeds to an input roller pair 25 of the processing machine. After the aforementioned cassette size sensing or determination and the withdrawal of the film from the respective cassette 7, a new film 18 is withdrawn from the respective storage receptacle 15 in accordance with the signal derived from the cassette-sensing means. This fresh film is engaged by the transport roller pair 19 and is advanced to the transporting roller pair 20 which then alone or in cooperation with any superposed transporting roller pairs 20 transports the film 18 through the passage 14 or the passages 14 of the mounting portions 5 toward the transporting or introducing roller pair 21 and from there into the then open cassette 7. When this film introduction is accomplished, the cassette 7 is closed. This closing operation activates a non-illustrated light barrier which energizes the drive of an arrangement for discharging the cassette 7 from the interior of the unit 3. After this cassette 7 has been removed, another cassette 7 can be immediately introduced into the cassette-handling unit 3 and, upon full insertion of the new cassette 7, it can be handled in the above-discussed manner, commencing with opening the same.

However, it can also happen that a very important X-ray film is to be processed preferentially to any other films which may already be present in the storage container 12. In this event, it is possible to move a path-selecting or deflecting element 30 into its other position so that the withdrawn film sheet which is to be preferentially treated is advanced by the transporting or conveying roller pair 21, which is driven in rotation in the opposite direction in this case, to the roller pair 29 which is arranged in parallel to the storage container 12. The transporting roller pair 29 then delivers the preferred film directly to the conveying roller pair 24, from where it proceeds directly to the input roller pair 25 of the processing machine 26.

When the above-discussed contruction of the arrangement according to the present invention is used, various arrangement systems can be assembled. So, for instance, as discussed above, the arrangement may be constructed as an unloading and loading arrangement BE including the units 3 and 5. However, it is also possible and contemplated by the present invention to only mount the cassette-handling unit 3 in the frame-shaped support 1 to obtain an arrangement E having the storage container 12 mounted thereon, so that the arrangement E with the storage container 12 then serve as an unloading arrangement only.

It will be understood that each of the elements described above, or two or more together, may also find a useful application in other types of arrangements differing from the type described above.

While the invention has been illustrated and described as embodied in an arrangement for unloading and loading X-ray film cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. An arrangement for unloading and loading cassettes, especially X-ray film cassettes, comprising a frame-shaped support; a cassette-handling station mounted on said support and including a housing defining an internal chamber for receiving the respective cassette, and means for light-tightly handling the respective cassette in said internal chamber, including means for unloading and loading the cassette; a plurality of storage receptacle mounting portions of identical configurations supported in said frame-shaped support and having respective channels of identical dimensions; a plurality of storage receptacles having identical external dimensions compatible with those of said channels for accommodation therein and each including means for bounding a recess dimensioned to fittingly receive a stack of films of a size selected from a plurality of different sizes; means for transporting the individual films from the respective storage receptacles to said handling station for loading into the respective cassettes; and means for conveying the films unloaded from the respective cassettes out of said handling station.

2. The arrangement as defined in claim 1, wherein said bounding means includes a number of inserts at least corresponding to the number of said storage receptacles and each having one of said recesses and being received in one of said storage receptacles.

3. The arrangement as defined in claim 2, wherein each of said inserts has a substantially plate-shaped configuration having a height substantially corresponding to the height of the stack of films to be received in said recess thereof; and wherein said recesses in said inserts have substantially rectangular configurations and are so situated that one corner thereof is arranged at the same corner region of each of said inserts.

4. The arrangement as defined in claim 1, wherein said bounding means of each of said storage receptacles is so configured and situated that the respective recess is substantially rectangular and has a depth corresponding to the height of the stack to be received therein and that one corner of the respective recess is arranged at the same corner region of each of said storage receptacles.

5. The arrangement as defined in claim 1, wherein each of said storage receptacle mounting portions extends substantially along a path and includes a slot-shaped through passage extending normal to said plane and transversely to the direction of introduction of the respective storage receptacle into said channel thereof.

6. The arrangement as defined in claim 5, wherein said cassette-handling station is constructed as a cassette-handling unit introducible into said frame-shaped support and includes a receiving recess; and further including a separate film-handling unit at least partially received in said receiving recess.

7. The arrangement as defined in claim 6, wherein said receiving recess is in substantial alignment with said through passages of said mounting portions.

8. The arrangement as defined in claim 6, wherein said film-handling unit includes a frame-shaped mounting element received in said receiving recess, and a storage container separate from and mounted on said mounting element.

9. The arrangement as defined in claim 6, wherein said film-handling unit includes an intermediate component connectable to a film-processing machine, a deflecting unit interposed between the intermediate component and the cassette-handling unit, a frame-shaped mounting element connectible to the intermediate component, and a storage container separate from and mounted on the mounting component.

10. The arrangement as defined in claim 9, wherein said deflecting unit is equipped with a path-selecting element therein operative for guiding the respective film into a selected one of at least two paths.

* * * * *